(12) United States Patent
Liu et al.

(10) Patent No.: US 6,308,327 B1
(45) Date of Patent: Oct. 23, 2001

(54) METHOD AND APPARATUS FOR INTEGRATED REAL-TIME INTERACTIVE CONTENT INSERTION AND MONITORING IN E-COMMERCE ENABLED INTERACTIVE DIGITAL TV

(75) Inventors: Lurng-Kuo Liu, White Plains; Jai Prakash Menon, Croton-on-Hudson; James S. Lipscomb, Yorktown Heights; Jeane Chen, Chappaqua; Liang-Jie Zhang, Hawthorne, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/531,533

(22) Filed: Mar. 21, 2000

(51) Int. Cl.⁷ .................................................. H04N 5/445
(52) U.S. Cl. .......................... 725/37; 345/326; 345/328; 348/722
(58) Field of Search ................... 348/3, 9, 722; 345/327–8, 326, 328; 709/219; 725/32, 36, 37, 60, 42

(56) References Cited

U.S. PATENT DOCUMENTS

| | | |
|---|---|---|
| 4,821,121 | 4/1989 | Beaulier . |
| 5,060,068 * | 10/1991 | Lindstrom ............................ 358/185 |
| 5,214,792 | 5/1993 | Alwadish . |
| 5,490,207 | 2/1996 | Schorr . |
| 5,515,098 * | 5/1996 | Carles ...................................... 348/8 |
| 5,619,251 | 4/1997 | Kuroiwa et al. . |
| 5,675,752 * | 10/1997 | Scott et al. ............................ 395/333 |
| 5,708,845 * | 1/1998 | Wistendahl et al. ................... 395/806 |
| 5,740,549 * | 4/1998 | Reilly et al. .............................. 70/14 |
| 5,759,101 | 6/1998 | Von Kohorn . |
| 5,812,642 | 9/1998 | Leroy . |
| 5,818,441 * | 10/1998 | Throckmorton et al. ............. 345/328 |
| 5,864,823 * | 1/1999 | Levitan ................................... 105/14 |
| 5,880,720 * | 3/1999 | Iwafune et al. ....................... 345/327 |
| 5,931,908 | 8/1999 | Gerba et al. . |
| 5,957,695 * | 9/1999 | Redford et al. ....................... 434/307 |
| 5,959,623 * | 9/1999 | Van Hoff et al. ..................... 345/333 |
| 6,009,409 * | 12/1999 | Adler et al. ............................. 705/14 |
| 6,075,551 * | 6/2000 | Berezowski et al. .................... 348/9 |
| 6,169,542 * | 1/2001 | Hooks et al. ......................... 345/327 |
| 6,188,398 * | 2/2001 | Collins-Rector et al. ............ 345/327 |

* cited by examiner

*Primary Examiner*—Andrew Faile
*Assistant Examiner*—Ngoc Vu
(74) *Attorney, Agent, or Firm*—Joseph C. Redmond, Jr.; David M. Shofi; Morgan & Finnegan, LLP

(57) ABSTRACT

An improved method and apparatus are disclosed for selectively inserting interactive content into a live TV or recorded broadcasting presentation and tracking the usage of the inserted content by end user viewers of the presentation. The method and apparatus enable operators to watch the live audiovisual programming feed, view and navigate product lists from e-commerce servers, control the insertion of interactive content into the audiovisual programming, monitor the content insertion status, and track the usage by client viewers of the inserted content in real time. It is especially useful for interactive e-commerce applications.

17 Claims, 4 Drawing Sheets

METHOD AND APPARATUS FOR INTEGRATED REAL-TIME INTERACTIVE CONTENT INSERTION AND MONITORING IN E-COMMERCE ENABLED INTERACTIVE DIGITAL TV

FIELD OF THE INVENTION

The invention disclosed broadly relates to computer systems and methods, and more particularly relates to computer systems and methods for interactive content insertion in interactive digital television environment.

BACKGROUND OF THE INVENTION

Television production, mass media, and Internet technology companies are turning their attention to the emerging medium of Interactive TV. Interactive TV uses technologies from the Internet to deliver interactive content in the form of graphical and informational elements on the same screen as a video program. Once transmitted over the air or via telephone wires and cables, the interactive content is televised on top of video programming viewed on traditional TV sets, computers, and on other video-ready digital products To the end user or viewer, the interactive content appears as graphical and informational images on the screen overlaying a video broadcast. Often these images are opaque and cover the video broadcast in part, or they are transparent or semi-transparent. Specific reoccurring interactive content images include icons, banners, labels, menus, information about the program, data one can print, open text fields in which one can insert an email address, or forms to fill out in order to buy a product. If the producer has done an adequate job, the interactive content will be relevant to the television programming presented with it.

To navigate and participate in such interactive television broadcasts, viewers can use the buttons on the remote control, type commands or words with a wireless keyboard on certain systems, or use the mouse if viewing interactive TV via a computer with a TV tuner card. Depending upon the network, the viewer's set-top box will receive an electronic programming guide (EPG); a special TV-online service containing links to local information; or applications like email, games, home banking, and community message boards. The viewer's responses to the interactive content are transferred by the set-top box as signals back to the broadcast station. Where the viewer's set-top box is connected to the broadcaster over a cable TV network, the viewer's response signals are returned over a duplex commumication path of the cable TV network. Where the viewer 's set-top box is connected to the broadcaster over a wireless link, the viewer's response signals can be returned over a duplex commumication path of the wireless link or alternately they may be returned via another medium, such as the public switched telephone network.

A problem exists in how to effectively control the Digital TV Studio to organize the interactive content and input its data to an MPEG-2 data injector, which embeds the interactive content in an MPEG-2 Transport Stream to be sent to the end user. Today's systems generally require the broadcaster to preview the entire length of each program before the program is transmitted, in order to index the program with sequential code data representing the interactive content to be presented in the program. Such systems generally require separate sub-systems to watch the program and lack the capability to monitor the end user's usage of the interactive content.

SUMMARY OF THE INVENTION

To address the above problem, the present invention provides an improved method and apparatus for selectively inserting interactive content into a live TV or recorded broadcasting presentation and tracking the usage of the inserted content by end user viewers of the presentation. The invention enables operators to watch the live audiovisual programming feed, view and navigate product lists from e-commerce servers, control the insertion of interactive content into the audiovisual programming, monitor the content insertion status, and track the usage by client viewers of the inserted content in real time.

The invention embeds content into digital TV programs. It includes the features of an advanced, agent based, information exchanging mechanism between different web browsers, real-time information fetching and organizing, real-time information broadcasting, the ability to cancel existing embedded interactive content, and interactive contents sorting. The invention further includes an integrated monitoring system, a live audiovisual feed (original live TV program) preview feature, an interactive icon (user interface of an inserted interactive service) preview feature, client site interactive services status monitoring, acknowledgment of content insertion, and the ability to save cost compared to traditional TV studios. The invention features an e-commerce enablement environment for monitoring transaction results returned from the viewers. The invention also provides an automatic execution feature, based on scheduling for event-driven automatic execution using an event-action mapping list or based on time-driven automatic execution using a time-action mapping list.

DISCUSSION OF THE PREFERRED EMBODIMENT

Figure 1:
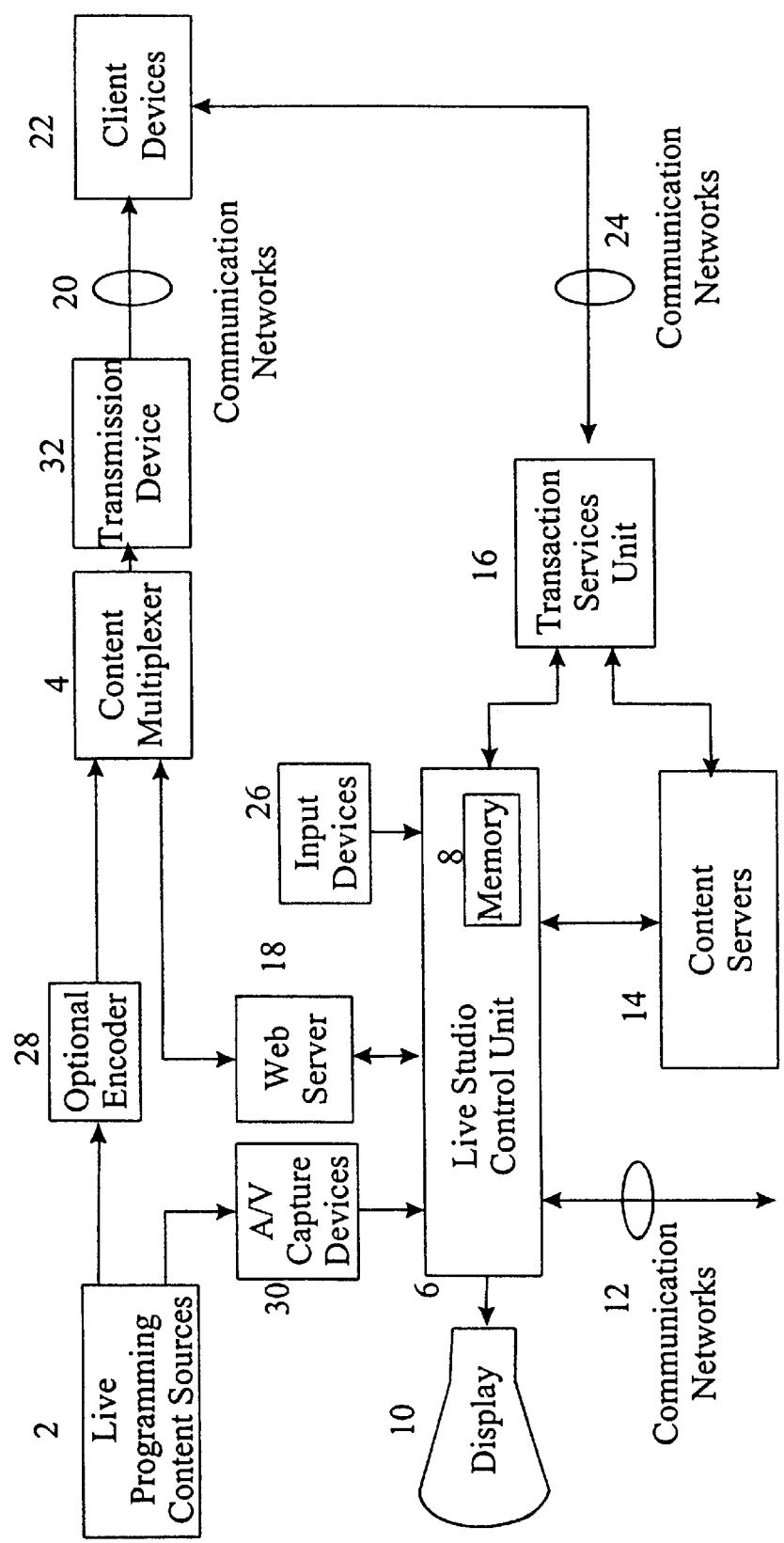
FIG. 1 is a system diagram of the invention.

FIG. 1 shows an embodiment of the system aspect of the invention, for enabling real-time content insertion in an e-commerce enabled, interactive digital TV. Live programming content sources 2 include but are not limited to direct camera shooting, satellite transmitted programs, or other sources. The live programming content is fed into an optional encoder 28 for compression and reduction in bandwidth requirement. The live programming content is then fed into a content multiplexer 4. The live programming content is also transmitted to and captured by an audiovisual capture device 30 at a live studio control unit 6. The live studio control unit 6 includes a data processing computer with input devices 26. The computer of the control unit 6 includes a memory 8, a high capacity disk drive storage device, and a communication interface, and is capable of showing audiovisual information and other data on a display 10. The memory 8 stores computer programs which are sequences of executable instructions. When the instructions stored in the memory 8 are executed by the computer of the control unit 6, they carry out the operations and functions of the invention.

On the display 10, a live operator watches the live programming content received from live programming content sources 2, monitors the tracking status received from a transaction service unit 16, views the performance of the data insertion operations, and previews the interactive contents received from content servers 14. The content from the content servers may be a live interactive content feed. The operator may see interactive content, say, a product-buy opportunity, that is relevant to the program and decides to add the interactive content to the program. The live studio control unit 6 retrieves data from the content servers 14 and sends a request and the data to a Web server 18 and in turn sends the data to the content multiplexer 4. The decision of inserting interactive content can also be scheduled automatically based on the events in the program as an event-action mapping list or the presentation elapsed time of the program as a time-action mapping list. It can also be controlled remotely through the communication networks 12. The content multiplexer 4 multiplexes the interactive content and the program. A transmission device 32 takes the synchronized combined content produced by the content multiplexer 4 and transmits to client devices 22 via communication networks 20.

The client device 22 may be a set-top box that connects to a TV. The client device 22 is able to process the added interactive content and to allow the users to interact with the interactive content. Some of the interactive functions may invoke other levels of interactions and require more data from other remote locations. The client device 22 sends the user's interaction to a transaction services unit 16 through communication networks 24. The transaction services unit 24 is then connected to the content servers 14 to fulfill the interactive functions.

Figure 2:
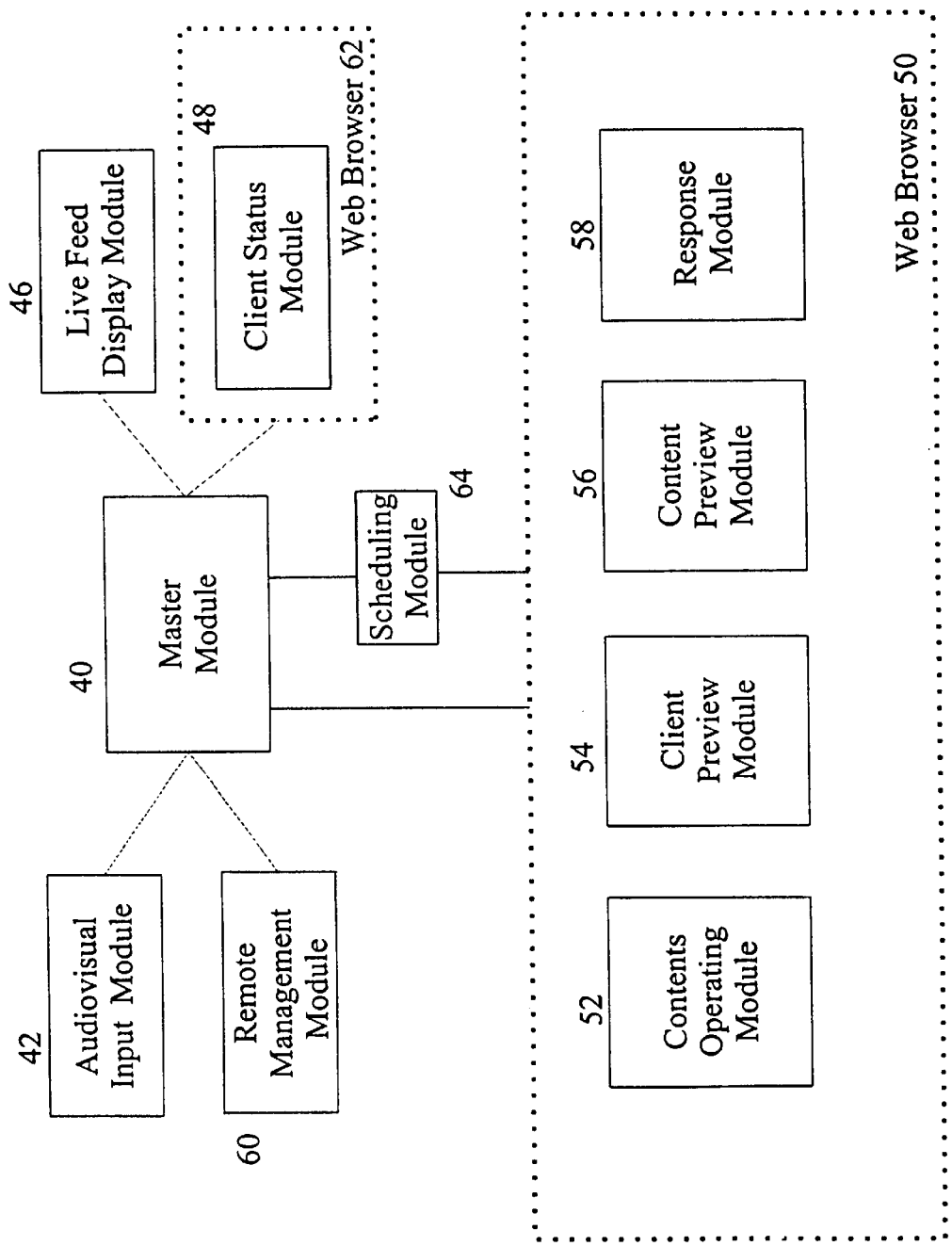
FIG. 2 is a data flow diagram of the computer program software of the invention.

FIG. 2 shows an embodiment of the computer program aspect of the invention which runs on the live studio control unit 6 of FIG. 1 to perform live program viewing, status monitoring, content insertion selection, and e-commerce status tracking. The master module 40 receives a live program feed from an audiovisual input module 42 and send it to a live feed display module 46. A web browser 50 is controlled by the master module 40 and loads a set of interactive content from local storage devices, content servers 14 of FIG. 1, or other remote locations into a contents operating module 52. The interactive content may include but not be limited to a product list, total sent, last time sent, total viewed, total sold, the promotion status, and other e-commerce related information. The web browser 50 also contains other modules, including but not limited to a client preview module 54, a content preview module 56 for interactive services level-two content, and a response module 58. An operator can navigate through all the interactive content in the contents operating module 52. An operator can also rearrange the display order of the interactive content to reflect to the changes in the program. For each interactive content that the operator navigates, the expected level-one view at client sites can be previewed at the client preview module 54. The expected level-two content can be previewed at the content preview module 56. The level-one view is the view of an audiovisual program overlay with a user interface for the interactive service. The level-two content is the content that viewers will see at the client site when viewers respond to the level-one interactive service user interface. The operator may choose interactive content relevant to the program and sends the data insertion request to the Web server 18 of FIG. 1 through the browser 50. The response to the request is displayed in the response module 58. The actual status of client devices is shown in the client status module 48. The client status module 48 may be hosted in a web browser 62. However, this invention is not limited in this respect. The master module 40 serves as an agent to exchange the information between the web browser 50 and the client status module 48. A remote management module 60 receives commands from a remote site and interfaces with the master module 40. It allows a user to control the operation of the live studio control unit 6 of FIG. 1 from a remote site. A scheduling module 64 controls the live studio control unit 6 to activate data insertion task in a scheduled way.

Figure 3:
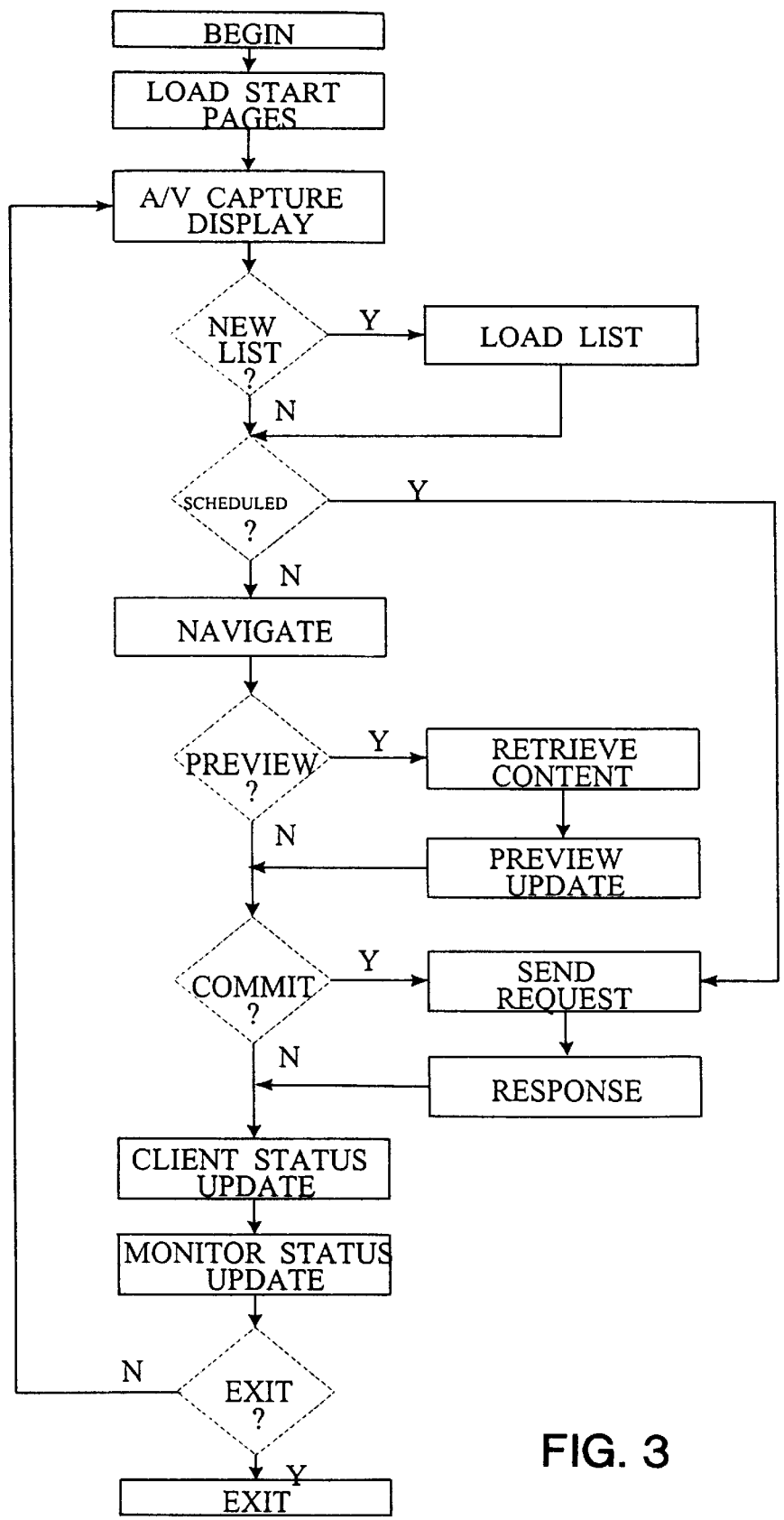
FIG. 3 is a flow diagram of the method of the invention.

FIG. 3 shows a flow diagram of the method aspect of the invention, which is emodied as a computer program that runs on the live studio control unit 6 of FIG. 1 to perform live program viewing, status monitoring, content insertion selection, and e-commerce status tracking. Once the computer program is initiated, a LOAD_START_PAGES function loads the start pages for the web browsers 50 and 62. An A/V_CAPTURE_DISPLAY function captures the live audiovisual programming and displays the audiovisual content in the live feed display module 46, client status module 48, and the client preview module 54. A NEW_LIST function identifies when the operator has decided to load a new list of interactive contents. When the NEW_LIST function identifies that the operator has decided to load a new list of interactive contents, a LOAD_LIST function is invoked, which is an interactive procedure that enables the operator to select the source of the list. The list of the interactive contents is then displayed in the contents operating module 52. A SCHEDULED function identifies when the system should send an insertion request automatically. The function can be set locally or remotely. When the SCHEDULED function identifies that the system should send an insertion request, a SEND_REQUEST function is invoked.

The NAVIGATE function provides the operator with the ability to navigate through the list of the interactive contents. For example, the NAVIGATE function preferably includes SCROLL, HYPERLINK, and SORT. The SCROLL function controls the scrolling of the list in the contents operating module 52. The HYPERLINK function controls the contents operating module 52 to display a particular area of the list, which may be identified by the embedded hyperlink information. The SORT function controls the contents operating module 52 to rearrange the order of the contents.

A PREVIEW function identifies when the operator has decided to preview an item of the interactive content in the list. When the PREVIEW function identifies that the operator has decided to preview an item in the list, a RETRIVE_CONTENT function is invoked to load the corresponding contents from content servers. A PREVIEW_UPDATE function follows to update the contents in the client preview module 54 and the content preview module 56. A COMMIT function identifies when the operator has decided to insert the interactive content to the live programming. When the COMMIT function identifies that the operator has decided to insert the interactive content to the live programming, a SEND_REQUEST function is invoked to send the request of content insertion to the Web server 18 and in turn the content multiplexer 4 through the Web browser 50. A RESPONSE function takes the response of the SEND_REQUEST and shows the response in the response module 58. A CLIENT_STATUS_UPDATE function controls the update of the client status module 48. The user interface of an inserted interactive content is only available at a specified time based on the lifetime of the inserted interactive content. A MONITOR_STATUS_UPDATE function controls the update of the status shown in the contents operating module 52. These include but not limited to total sent, last time sent, total viewed, total sold, the promotion status, and other e-commerce related information. The update information is derived from the SEND-REQUEST function or from the feedback of the transaction services unit 16.

Figure 4:
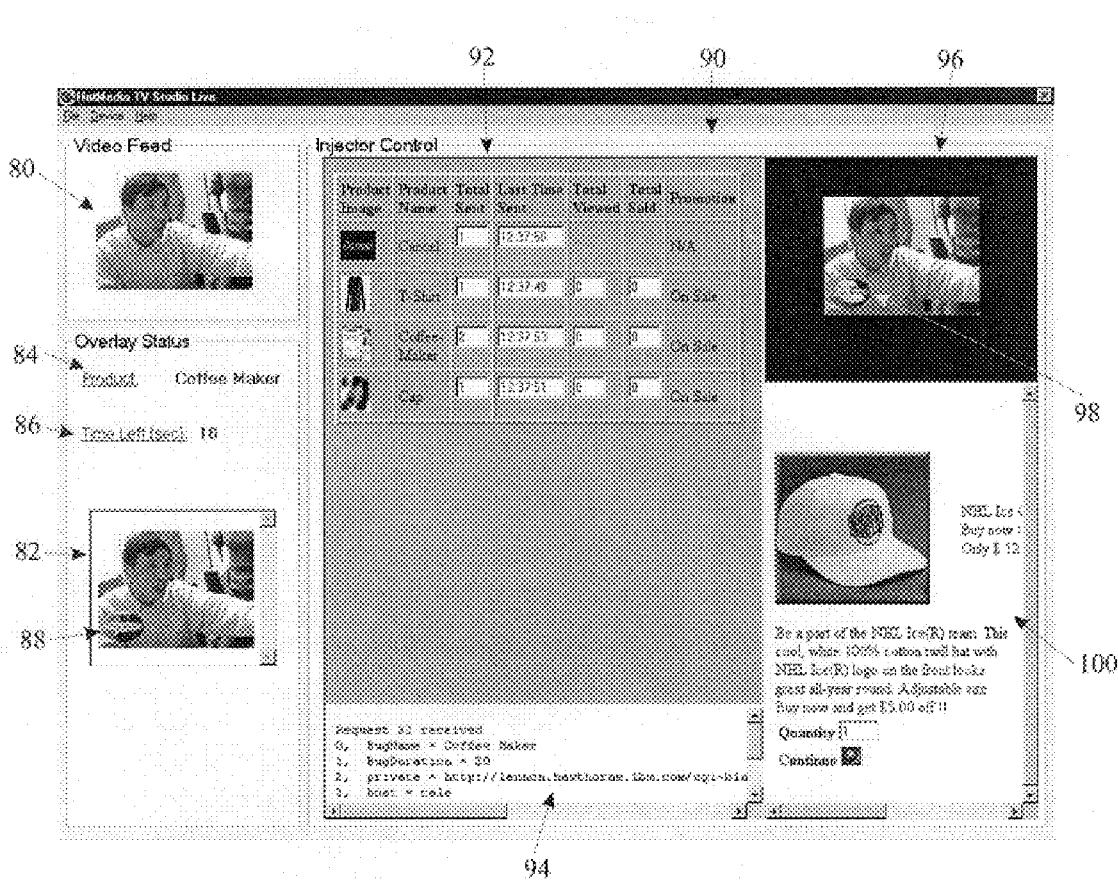
FIG. 4 shows the graphical user interface of the invention.

FIG. 4 illustrates an example of a graphical user interface at the live studio control unit for the computer program system of FIGS. 2 and 3. In this embodiment, the interactive contents are the products list and the monitoring status with total sent, last time sent, total viewed, total sold, and promotion status. However, the present invention is not limited in this respect and can have any information collected by the transaction services unit 16 and the content servers 14. There is a video window 80 on the top left, in which the live programming feed is displayed. On the lower left is the client status window 82 with the product name 84 and lifetime remaining 86 of the inserted interactive content, which is a product buying opportunity. The user interface of the inserted product buying opportunity is shown as an icon(bug) 88. On the right is an embedded web browser 90 with four frames in side. On the upper left of the web browser 90 is the contents operating frame 92 with a product list and their associated tracking status. On the lower left of the web browser 90 is the request response frame 94 to display the response of the request sent by the operator. On the upper right of the web browser 90 is the client preview frame 96. The selected product buying icon 98 is be overlaid on top of the video in the preview frame 96. On the lower right of the web browser is the content preview frame 100. The content displayed in this frame is the preview of the content that is displayed on the client devices when viewers click on the buy icon 98.

The resulting invention provides an advanced architecture and information exchanging mechanism for selectively inserting interactive content into a live TV broadcasting presentation and tracking the usage of the inserted content by client viewers of the presentation. It is especially useful for interactive e-commerce applications.

While the invention has been described with reference to specific embodiments, the description of the specific embodiments is illustrative only and is not to be considered as limiting the scope of the invention. Various other modifications and changes may occur to those skilled in the art without departing from the spirit and scope of the invention.

What is claimed is:

1. A method for selectively inserting interactive content at a live TV studio into a TV broadcasting presentation whereby said interactive content is related to content of said broadcasting presentation, comprising:

storing at least one file containing interactive content and a list referring to said content;

capturing audiovisual programming from a TV broadcasting presentation;

monitoring a transaction services unit for viewer interaction with the interactive content;

presenting to an operator at the live TV studio said list;

enabling said operator at the live TV studio to navigate said list by scrolling the list;

enabling said operator at the live TV studio to navigate said list by display an interactive content of the list identified by an embedded hyperlink information;

enabling said operator at the live TV studio to navigate said list by sorting to rearrange the order of the contents;

enabling said operator at the live TV studio to preview an item of the interactive content in the list;

receiving from the operator at the live TV studio a selection of said content, an indication of a time for presentation of the selected content, and a position for presentation of the selected content within said broadcasting audiovisual programming; and combining said selected content with said broadcasting audiovisual programming based on the viewer interaction with the interactive content, said selected content being in said position for presentation and available at said time for presentation.

2. The method of claim 1, which further comprises:

enabling said operator to watch said captured programming, view and navigate said list, and control insertion of said interactive content into said broadcasting programming.

3. The method of claim 1, which further comprises:

receiving transaction results induced from viewers of said interactive content; and tracking usage of said interactive content by said viewers.

4. The method of claim 1, which further comprises:

monitoring e-commerce transaction results induced from said viewers.

5. The method of claim 1, which further comprises:

automatically combining said selected content with said broadcasting audiovisual programming by scheduling using an event-action mapping list.

6. The method of claim 1, which further comprises:

automatically combining said selected content with said broadcasting audiovisual programming by scheduling using a time-action mapping list.

7. The method of claim 1, which further comprises:

enabling said operator to preview an item of the interactive content in the list.

8. A system for selectively inserting interactive content at a live TV studio into a TV broadcasting presentation whereby said interactive content is related to content of said broadcasting presentation, comprising:

a control unit including a computer and a memory, for referencing at least one file containing interactive content on either a remote or local computer and a list referring to said content;

a capture device coupled to the control unit and to a live programming content source, for capturing audiovisual programming from a TV broadcasting presentation at the live TV studio;

a display coupled to the control unit, for presenting at the live TV studio to an operator said list;

an input device coupled to the control unit, for receiving from the operator a selection of said content, an indication of a time for presentation of the selected content, and a position for presentation of the selected content within said broadcasting audiovisual programming;

a multiplexer coupled to the control unit and to a communications network, for combining said selected content with said broadcasting audiovisual programming, said selected content being in said position for presentation and available at said time for presentation;

means enabling said operator at the live TV studio to navigate said list by sorting to rearrange the order of the contents;

means enabling said operator at the live TV studio to preview an item of the interactive content in the list; and means combining said selected content with said broadcasting audiovisual programming based on the viewer interaction with the interactive content, said selected content being in said position for presentation and available at said time for presentation.

9. The system of claim 8, which further comprises:

said control unit enabling said operator to watch said captured programming, view and navigate said list, and control insertion of said interactive content into said broadcasting programming.

10. The system of claim 8, which further comprises:

a transaction services unit coupled to the control unit and to the communications network, for receiving transaction results induced from viewers of said interactive content; and said control unit tracking usage of said interactive content by said viewers.

11. The system of claim 8, which further comprises:

said control unit monitoring e-commerce transaction results returned from said viewers.

12. The system of claim 8, which further comprises:

said control unit controlling said multiplexer to automatically combine said selected content with said broadcasting audiovisual programming by scheduling using an event-action mapping list.

13. The system of claim 8, which further comprises:

said control unit controlling said multiplexer to automatically combine said selected content with said broadcasting audiovisual programming by scheduling using a time-action mapping list.

14. The system of claim 8, which further comprises:

said control unit enabling said operator to preview an item of the interactive content in the list.

15. A computer program for execution in a computer having a memory, to selectively insert interactive content at a alive TV studio into a TV broadcasting presentation whereby said interactive content is related to content of said broadcasting presentation, comprising:

program code for storing in the memory at least one file containing interactive content and a list referring to said content;

program code for capturing in the memory audiovisual programming from a TV broadcasting presentation;

program code for presenting at a live TV studio to an operator said list in a display coupled to the computer;

program code for receiving from the operator at a alive TV studio a selection of said content, an indication of a time for presentation of the selected content, and a position for presentation of the selected content within said broadcasting audiovisual programming;

program code for combining in a multiplexer coupled to the computer said selected content with said broadcasting audiovisual programming, said selected content being in said position for presentation and available at said time for presentation;

program code enabling said operator at the live TV studio to navigate said list by sorting to rearrange the order of the contents;

program code enabling said operator at the live TV studio to preview an item of the interactive content in the list; and program code combining said selected content with said broadcasting audiovisual programming based on the viewer interaction with the interactive content, said selected content being in said position for presentation and available at said time for presentation.

16. The computer program of claim 15, which further comprises:

program code for receiving transaction results induced from viewers of said interactive content; and program code for tracking usage of said interactive content by said viewers.

17. The computer program of claim 15, which further comprises:

program code for monitoring e-commerce transaction results returned from said viewers.

\* \* \* \* \*

UNITED STATES PATENT AND TRADEMARK OFFICE
CERTIFICATE OF CORRECTION

PATENT NO.    : 6,308,327 B1
DATED         : October 23, 2001
INVENTOR(S)   : Liu et al.

It is certified that error appears in the above-identified patent and that said Letters Patent is hereby corrected as shown below:

<u>Title page,</u>
Item [75], please add the names of the following joint inventors:

-- Jose R. Brunheroto, Mohegan Lake, NY; Paolo Dettori, Elmsford, NY; Frank A. Schaffa, Hartsdale, NY; and David I. Seidman, Bronx, NY --

Signed and Sealed this

Twenty-ninth Day of April, 2003

JAMES E. ROGAN
*Director of the United States Patent and Trademark Office*